(12) United States Patent
Addison

(10) Patent No.: US 10,296,973 B2
(45) Date of Patent: May 21, 2019

(54) FINANCIAL INFORMATION EXCHANGE (FIX) PROTOCOL BASED LOAD BALANCING

(71) Applicant: Fortinet, Inc., Sunnyvale, CA (US)

(72) Inventor: Jon Addison, Rickmansworth (GB)

(73) Assignee: Fortinet, Inc., Sunnyvale, CA (US)

( * ) Notice: Subject to any disclaimer, the term of this patent is extended or adjusted under 35 U.S.C. 154(b) by 1250 days.

(21) Appl. No.: 14/338,532

(22) Filed: Jul. 23, 2014

(65) Prior Publication Data

US 2016/0027108 A1    Jan. 28, 2016

(51) Int. Cl.
*G06Q 40/04* (2012.01)
*H04L 29/08* (2006.01)

(52) U.S. Cl.
CPC ....... *G06Q 40/04* (2013.01); *H04L 29/08288* (2013.01)

(58) Field of Classification Search
CPC ........ G06Q 40/04; G06Q 40/06; G06Q 40/02; H04L 29/06163; H04L 5/00; H04L 67/1002; H04L 69/08; H04L 47/125; H04L 47/193; H04W 28/08
See application file for complete search history.

(56) References Cited

U.S. PATENT DOCUMENTS

| | | | | |
|---|---|---|---|---|
| 6,128,279 | A * | 10/2000 | O'Neil | H04L 67/1008 370/229 |
| 6,523,036 | B1 * | 2/2003 | Hickman | G06F 16/27 707/704 |
| 6,549,934 | B1 * | 4/2003 | Peterson | H04L 49/90 709/203 |
| 6,578,068 | B1 * | 6/2003 | Bowman-Amuah | G06F 9/465 709/203 |
| 6,725,446 | B1 * | 4/2004 | Hahn | G06F 16/958 717/103 |

(Continued)

FOREIGN PATENT DOCUMENTS

CA          282056     *   5/2011

OTHER PUBLICATIONS

"Big data analytics computing requires a maverick fabric", Network Work (Online), Southborough, Sep. 25, 2012, pp. 1-5.*

*Primary Examiner* — Mohammad Z Shaikh
(74) *Attorney, Agent, or Firm* — Jaffery Watson Mendonsa & Hamilton LLP

(57) ABSTRACT

Methods and systems for efficiently allocating a Financial Information eXchange (FIX) protocol based trading session/transaction a server by means of a load balancer are provided. According to one embodiment, a FIX packet of a FIX session is received at a load balancer fronting multiple servers of a high frequency trading (HFT) platform. A customer of the HFT platform is identified based on a SenderCompID field of the FIX packet. A customer weighting factor is determined based on a previously ascertained usage pattern of resources of the HFT platform by the customer. The customer is assigned to a server based on the weighting factor and a load of the selected server. A transport protocol flow associated with the FIX session is offloaded to a Network Processor (NP) Application Specific Integrated Circuit (ASIC). Therefore, subsequent FIX packets of the FIX session are processed by the NP ASIC.

5 Claims, 11 Drawing Sheets

(56) References Cited

U.S. PATENT DOCUMENTS

| | | | |
|---|---|---|---|
| 7,068,597 B1* | 6/2006 | Fijolek | H04L 41/0853 370/230 |
| 7,099,915 B1* | 8/2006 | Tenereillo | H04L 67/1008 709/203 |
| 7,149,819 B2* | 12/2006 | Pettey | H04L 29/06 709/250 |
| 7,185,096 B2* | 2/2007 | Kalyanavarathan | G06F 9/5033 709/224 |
| 7,207,044 B2* | 4/2007 | Laux | H04L 29/06 709/203 |
| 7,475,157 B1* | 1/2009 | Tormasov | H04L 67/1008 709/227 |
| 7,685,044 B1* | 3/2010 | Robertson | G06Q 40/00 705/35 |
| 7,774,492 B2* | 8/2010 | Raphel | H04L 47/10 370/229 |
| 7,788,042 B2* | 8/2010 | Barnett | A61B 5/0002 600/300 |
| 7,865,614 B2* | 1/2011 | Lu | H04L 29/06 370/503 |
| 7,937,470 B2* | 5/2011 | Curley | H04L 41/12 370/241 |
| 8,051,213 B2* | 11/2011 | Van Hensbergen | H04L 29/06 709/239 |
| 8,069,138 B2* | 11/2011 | Tully | G06Q 40/00 705/35 |
| 8,131,835 B2* | 3/2012 | Davis | G06F 9/5083 709/223 |
| 8,176,186 B2* | 5/2012 | McCanne | H03M 7/30 709/228 |
| 8,244,943 B2* | 8/2012 | Williamson | G06F 11/0748 710/109 |
| 8,291,108 B2* | 10/2012 | Raja | G06F 9/505 709/225 |
| 8,375,127 B1* | 2/2013 | Lita | G06F 16/958 709/226 |
| 8,413,160 B2* | 4/2013 | Armes | G06F 9/505 709/226 |
| 8,423,604 B2* | 4/2013 | Johnson | G06F 3/0611 709/203 |
| 8,533,308 B1* | 9/2013 | Rothstein | H04L 67/1002 370/229 |
| 8,656,047 B1* | 2/2014 | Lu | H04L 29/06 709/236 |
| 8,782,221 B2* | 7/2014 | Han | H04L 49/90 709/224 |
| 8,799,641 B1* | 8/2014 | Seidenberg | H04L 63/0876 713/153 |
| 8,954,495 B2* | 2/2015 | Cohen | H04L 67/32 709/203 |
| 8,977,749 B1* | 3/2015 | Han | H04L 49/90 709/223 |
| 9,009,351 B2* | 4/2015 | Lavoie | G06Q 40/04 705/37 |
| 9,118,571 B2* | 8/2015 | Bisht | H04L 47/125 |
| 9,185,006 B2* | 11/2015 | Uluderya | H04L 67/1008 |
| 9,537,973 B2* | 1/2017 | Batrouni | H04L 67/2842 |
| 9,680,764 B2* | 6/2017 | Prakash | H04L 47/70 |
| 9,813,344 B2* | 11/2017 | Basavaraja | H04L 45/745 |
| 2002/0040402 A1* | 4/2002 | Levy-Abegnoli | H04L 67/1008 709/229 |
| 2002/0042823 A1* | 4/2002 | DeBettencourt | G06F 11/0709 709/224 |
| 2003/0069952 A1* | 4/2003 | Tams | H04L 43/12 709/223 |
| 2003/0069968 A1* | 4/2003 | O'Neil | H04L 67/1008 709/225 |
| 2003/0101113 A1* | 5/2003 | Dang | G06Q 20/10 705/31 |
| 2003/0167223 A1* | 9/2003 | Pledereder | G06Q 40/04 705/37 |
| 2004/0054780 A1* | 3/2004 | Romero | H04L 41/5025 709/226 |
| 2004/0167840 A1* | 8/2004 | Tully | G06Q 40/00 705/35 |
| 2004/0243709 A1* | 12/2004 | Kalyanavarathan | G06F 9/5033 709/226 |
| 2005/0021530 A1* | 1/2005 | Garg | G06F 9/505 |
| 2005/0097026 A1* | 5/2005 | Morano | G06Q 40/04 705/37 |
| 2005/0198335 A1* | 9/2005 | Brown | H04L 67/1008 709/229 |
| 2006/0015645 A1* | 1/2006 | Ocko | H04L 67/2861 709/238 |
| 2006/0080273 A1* | 4/2006 | Degenaro | G06F 9/5055 |
| 2006/0195547 A1* | 8/2006 | Sundarrajan | H04L 69/163 709/217 |
| 2006/0195605 A1* | 8/2006 | Sundarrajan | H04L 47/10 709/232 |
| 2006/0277303 A1* | 12/2006 | Hegde | H04L 67/1008 709/226 |
| 2006/0288171 A1* | 12/2006 | Tsien | G06F 12/0653 711/136 |
| 2008/0037527 A1* | 2/2008 | Chan | H04L 67/104 370/353 |
| 2009/0328050 A1* | 12/2009 | Liu | G06F 9/5088 718/104 |
| 2010/0218018 A1* | 8/2010 | Parker, Jr. | G06F 1/3203 713/322 |
| 2011/0010460 A1* | 1/2011 | Lavoie | G06Q 40/04 709/231 |
| 2011/0055845 A1* | 3/2011 | Nandagopal | H04L 67/1023 718/105 |
| 2012/0005063 A1* | 1/2012 | Moitoso | G06Q 40/04 705/37 |
| 2012/0089677 A1* | 4/2012 | Shafran | H04L 65/1016 709/204 |
| 2012/0317578 A1* | 12/2012 | Kansal | G06F 9/5077 718/104 |
| 2013/0041707 A1* | 2/2013 | Bose | G06Q 40/06 705/7.15 |
| 2013/0173743 A1* | 7/2013 | Grigg | H04W 8/205 709/217 |
| 2013/0179888 A1* | 7/2013 | Russell | G06F 9/5083 718/101 |
| 2013/0185410 A1* | 7/2013 | Thyni | H04L 29/12358 709/223 |
| 2013/0212064 A1* | 8/2013 | Mahmoud | G06F 16/217 707/609 |
| 2013/0291107 A1* | 10/2013 | Marck | G06F 21/316 726/23 |
| 2013/0318239 A1* | 11/2013 | Scharf | H04L 69/16 709/224 |
| 2014/0012972 A1* | 1/2014 | Han | H04L 49/90 709/224 |
| 2014/0025800 A1* | 1/2014 | Sharma | H04L 67/1095 709/223 |
| 2014/0122698 A1* | 5/2014 | Batrouni | H04L 67/2833 709/224 |
| 2014/0372567 A1* | 12/2014 | Ganesh | H04L 67/1002 709/219 |
| 2015/0067027 A1* | 3/2015 | Liu | H04L 67/1027 709/203 |
| 2015/0088982 A1* | 3/2015 | Johnson | H04L 67/34 709/203 |
| 2015/0215236 A1* | 7/2015 | Joshi | H04L 47/806 707/754 |

\* cited by examiner

FINANCIAL INFORMATION EXCHANGE (FIX) PROTOCOL BASED LOAD BALANCING

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2014, Fortinet, Inc.

BACKGROUND

Field

Embodiments of the present invention generally relate to executing financial transactions. In particular, various embodiments relate to methods and systems for reducing latency in executing financial transactions by efficiently allocating sessions through load balancing to servers.

Description of the Related Art

Institutional buyers and sellers need to have reliable communication means to facilitate efficient trading in securities and other financial instruments. Traditionally, these parties have relied on telephone and fax communications to exchange orders, fills and other information (such as allocation information for bulk/block orders). Such methods have proven unreliable and susceptible to errors, e.g., as a result of transcribing information or transmitting information via voice communication means.

Adoption of Financial Information eXchange (FIX) as a protocol for electronically exchanging financial-transaction-related messages has the potential to bring a certain degree of efficiency to the trading process. The typical scenario where FIX has been used involves two parties to a financial transaction setting up a point-to-point communication link in order to exchange FIX protocol messages. However, this approach leads to two problems. The first problem is due to the establishment of numerous point-to-point communication links between the various members of the financial trading community, which can lead to an intractable mesh of communication links and nodes. The second problem is due to the evolution of the FIX protocol itself, which has resulted in the creation of numerous variants that are only loosely related to one another.

Delivery of trade related messages through trading applications to participants is highly time-sensitive, and almost approaches real-time. Providers of high frequency trading (HFT) platforms have to provide the lowest possible latency across the network infrastructure between a client/trader who places one or more trades, and the servers that process the trades. Such platforms not only have to maintain the trading application, but also need to manage market data, order, and the core software. In order to maintain a competitive edge, participants have to respond by changing their trading strategies and trading platform architectures to increase the speed of trading. Latency is an element that contributes to network speed and reflects time necessary to process the sale of a security and then to report the same to the market. Latency time is typically measured in microseconds or nanoseconds. A low latency network connection is the one that generally experiences small delay times, while a high latency connection generally suffers from long delays, and therefore low latency architecture for trading and reporting indicates lower efficiency in the platform.

Conventional financial trading platforms use a general Central Processing Unit (CPU) for inspecting packets and maintaining sessions across servers. Such a CPU also works in conjunction with multiple load balancers, which further increases the latency of transactions conducted within the sessions, wherein such latency can, in turn, equate to potentially large losses as prices of target financial instruments change rapidly. It is also wrongly thought that low latency periods can be achieved by reducing load on computing devices or by upgrading them by incorporating high speed processors, memory/other peripherals, or by improving software interface capabilities such as graphical user interface. However, although increase in processors might reduce some of the complications such as queue build-up, most of the processor time is used in processing information associated with other tasks such as enhancing software interface; making the underlying transactions to suffer with higher intrinsic latency and prevent the transaction platform from performing operations on incoming trade related messages.

There is therefore a need for a low latency system and method thereof for executing financial transactions based on the FIX protocol by efficiently allocating sessions through load balancing to servers.

SUMMARY

Methods and systems are described for efficiently allocating Financial Information eXchange (FIX) protocol based trading session through load balancing to one or more servers. According to one embodiment, a FIX packet of a FIX session relating to a transaction is received at a load balancer fronting multiple servers of a high frequency trading (HFT) platform. A customer of the HFT platform is identified based on a value of a SenderCompID field of the FIX packet. A weighting factor of the customer is determined based on a previously ascertained usage pattern of resources of the HFT platform by the customer. The customer is assigned to a server selected from the multiple servers based on the weighting factor and a load factor associated with the selected server. Subsequent FIX packets of the FIX session are processed by a Network Processor (NP) Application Specific Integrated Circuit (ASIC) of the load balancer or a network gateway device associated with the load balancer as a result of offloading, by the load balancer, a transport protocol flow (e.g., a Transmission Control Protocol (TCP) flow or a Stream Control Transmission Protocol (SCTP) flow) associated with the FIX session to the NP ASIC.

Other features of embodiments of the present invention will be apparent from the accompanying drawings and from the detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
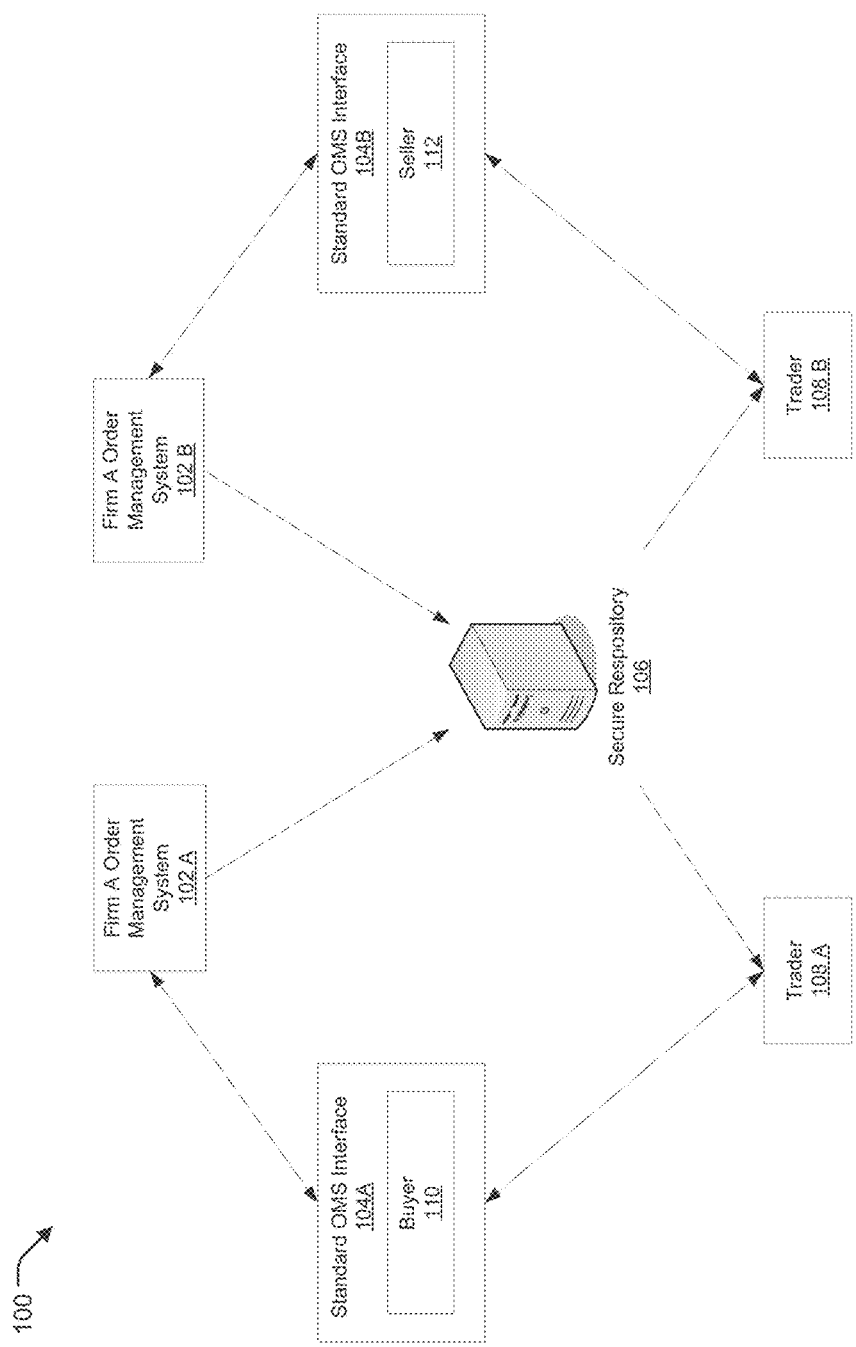
FIG. 1 illustrates an exemplary financial transaction system.

Methods and systems are described for efficiently allocating Financial Information eXchange (FIX) protocol based trading sessions through load balancing to one or more servers. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

If the specification states a component or feature "may", "can", "could", or "might" be included or have a characteristic, that particular component or feature is not required to be included or have the characteristic.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

Although the present disclosure has been described with the purpose of load balancing financial transactions across processing servers/elements, it should be appreciated that the same has been done merely to illustrate the invention in an exemplary manner and any other purpose or function for which the explained structure or configuration can be used, is covered within the scope of the present disclosure.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

Example implementations of the present disclosure described herein relate to financial transactions that are processed with low latency across a network infrastructure between a client/customer/firm/company that places a trade and/or initiates a transaction, and one or more servers that process the trades. In an implementation, a FIX protocol is used to communicate such trade information that can be interpreted by the servers that process the trades.

Example implementations described herein are directed to methods and systems for efficiently allocating Financial Information eXchange (FIX) protocol based trading sessions through active load balancing of these sessions to one or more servers.

The following materials regarding FIX version 5.0 (all available for download from http://www.fixtradingcommunity.org) are hereby incorporated by reference in their entirety for all purposes:

Volume 1—Introduction to the FIX Protocol
Volume 2—Transport Protocols
Volume 3—FIX Application Messages: Pre-Trade
Volume 4—FIX Application Messages: Orders and Executions (Trade)
Volume 5—FIX Application Messages: Post-Trade
Volume 6—FIX Data Dictionary
Volume 7—FIX Usage by Product The following FIX and FIXML training class materials from the American Century—Marcus Evans FIXML Training Class—New York, Feb. 26, 2001 are hereby incorporated by reference in their entirety for all purposes:

FIXML: Advancing FIX standards and developing implementation plans powering financial communications (available for download at http://www.fixtradingcommunity.org/pg/file/fplpo/read/30483/fix-and-fixml-training-class-20010226-part-1-of-4)

Transitioning to Advanced Versions of Messaging Standards (available for download at http://www.fixtradingcommunity.org/pg/file/fplpo/read/30484/fix-and-fixml-training-class-20010226-part-2-of-4)

FIX/FIXML Implementation (available for download at http://www.fixtradingcommunity.org/pg/file/fplpo/read/30485/fix-and-flxml-training-class-20010226-part-3-of-4)

ISO 15022 XML Working Group (available for download at http://www.fixtradingcommunity.org/pg/file/fplpo/read/30486/fix-and-flxml-training-class-20010226-part-4-of-4)

Methods and systems described herein are further directed to offloading transport protocol sessions to a Network Processor (NP) Application Specific Integrated Circuit (ASIC) for further processing of the transport protocol sessions, after allocating appropriate server to a customer/transaction through load balancing. Example implementations described herein are directed to a SenderCompID (SID) field extraction from the FIX packets that can be used to identify a company/customer sending the FIX message, and using a customer weight factor corresponding to the extracted SID along with server load factors of multiple servers to allocate the customer and/or transaction thereof to an appropriate server, where the customer weight is based on past usage of resources such as network bandwidth, number of sessions initiated, frequency of transactions, and volume of transactions in a session, among other like attributes. In an example, load balancing methods and systems therefore determine the most appropriate server from the plurality of available servers for allocating the particular FIX session/transaction for execution. In an example implementation, systems and methods of present description allocate the FIX session to a server that is the least weighted server.

In an exemplary implementation, methods of the present disclosure can include receiving, at a load balancer fronting multiple servers, a Financial Information Exchange (FIX) packet of a FIX session relating to a transaction, and identifying, by the load balancer, a customer of multiple customers based on a value of a SenderCompID field of the FIX packet. The method can further include the step of determining, by the load balancer, a weighting factor of the customer, where the weighting factor is based on a previously ascertained usage pattern of resources by the customer. Methods of the present disclosure can further include assigning, by the load balancer, the customer to a server selected from multiple servers based on the weighting factor and a load factor associated with the selected server, and processing subsequent FIX packets of the FIX session through a Network Processor (NP) Application Specific Integrated Circuit (ASIC) of the load balancer, by offloading, by the load balancer, a transport protocol flow (e.g., a Transmission Control Protocol (TCP) flow or a Stream Control Transmission Protocol (SCTP)) associated with the FIX session to the NP ASIC. In an aspect, the step of offloading can further include mapping transport protocol sequence numbers of the FIX packet and the subsequent FIX packets to spliced sequence numbers of the NP ASIC.

In an aspect of the present disclosure, the selected server can be the least loaded server of the plurality of servers. In another aspect, upon assignment of a transaction/session to a server, load factor of the respective server can be increased based on the weighting factor. In another aspect, after the transaction has been completed, load factor of the assigned server can be decreased based on the weighting factor. In yet another aspect, a given firm/customer/company can have multiple SenderCompID values associated therewith, which can be individually and/or collectively used for computation of the final weighting factor for the respective customer.

Methods and systems are also provided for offloading sessions after server allocation to a Network Processor (NP) Application Specific Integrated Circuit (ASIC) for further processing of the sessions. According to one embodiment, a SenderCompID (SID) field, which is an assigned value used to identify the firm/customer/company sending the FIX message at issue, is extracted from a FIX packet. A customer weighting factor (e.g., a value indicating the amount of resources generally used by the customer) corresponding to extracted SID is then determined. Based on the customer weighting factor, the session is allocated to an appropriate server. In an embodiment, the allocated server is the least weighted server.

According to one embodiment, a system comprises a FIX packet receive module, a company identifier field extraction module, a weight computation module, a server allocation module, an ASIC-based offloading module, and a transaction processing module. The FIX packet receive module can be configured to receive one or more initial FIX packets of a transaction that is intended to be processed. FIX sessions are initially created by clients/traders using multiple client interfaces, wherein transactions are then processed with each session to create and manage orders. In an implementation, the FIX packet receive module can be configured to receive only the first FIX packet of a transaction in order to conduct further processing for load balancing, or, in another implementation, can be configured to receive multiple initial packets.

According to one embodiment, the company identifier field extraction module is configured to extract a company/firm/customer identifier from the initial FIX packet(s) of the transaction. FIX protocol packets have a sender company/customer identifier (e.g., a value in the SenderCompID field), which can be parsed and extracted by the company identifier field extraction module in order to identify the company (also interchangeably referred to as customer or firm hereinafter) from which the packets have been received.

Weight computation module can be configured to determine a customer weighting factor for the customer associated with the extracted company identifier and a current load factor for each of the servers. The customer weighting factor can be determined based on a previously ascertained usage pattern of resources by the customer. In an instance, the resources can be based on the number, volume, scale, type, identifiers, and characteristics of transactions/sessions in which the customer is typically involved. A customer performing a large volume of transactions may therefore have a higher weighting factor.

According to one embodiment, the server allocation module can be configured to allocate a server selected from multiple servers to the customer, also, in the present context, interchangeably referred to as the transaction and/or to the session to which the transaction belongs based on the customer weighting factor and server load factor. Therefore, although part of the disclosure would be described with reference to the customer being assigned by the load balancer to the server, one should appreciate that it's actually the underlying transaction from the customer/company/firm that would be assigned to the server for efficient processing of the packets issued as part of the transaction. In an implementation, the allocated server is the least weighted server. For instance, a customer having a high weighting factor is typically a heavy user of the backend system and therefore needs to be allocated higher bandwidth and space to allow low latency, which is possible by selecting the server having the lowest weight.

According to an embodiment, an ASIC-based offloading module can be configured to offload a Transmission Control Protocol (TCP) flow associated with the FIX session to a Network Processor (NP) Application Specific Integrated Circuit (ASIC). In an implementation, sequence numbers of the TCP flow can first be mapped to spliced sequence numbers of the NP ASIC, after which the TCP flow can be offloaded to the NP ASIC.

According to another embodiment, a transaction processing module can be configured to process subsequent FIX packets of the FIX session through the NP ASIC. According to one embodiment, termination module can be configured to decrease the load factor based on the weighting factor once the transaction is complete.

One should appreciate that in the instant disclosure, the terms company, customer, client, user, firm, are being used interchangeably and hence their use is not limiting any manner. At the same time, one should also appreciate that although the present disclosure, at different instances, states assignment of a customer/company/firm to a server based on its weighting factor, it's the transaction and/or the financial session that is assigned to the server so that the concerned transaction can be carried out at the assigned server. Therefore, interpretation of customer assignment can be referred to as assignment of the customer for the instant transaction in context.

Embodiments of present disclosure and their advantages are best understood by reference to the figure descriptions below.

FIG. 1 illustrates an exemplary financial transaction system/architecture/environment 100 showing exemplary traders, such as a trader 102A and a trader 102B, which may be collectively or individually referred to as trader(s) 102 or customers and/or companies and/or firms 102, engaged in trading of shares, bonds, among other like financial instruments, and electronically exchanging other types of financial-transaction-related messages. In an exemplary implementation, there may be a plurality of trading companies/firms placing orders to book, for instance, shares or bonds, and a plurality of trading companies buying shares and bonds. As described above, these financial transactions need to be secured, and at the same time, need to be executed in almost real-time without undesirable transactional latency. In a typical financial transaction system 100, each trader 102 can be operatively coupled with an order management (OMS) interface such as 104A and 104B, which may be collectively or individually referred to as order management interface(s) 104, having, for instance, a buyer module 110 to enable placement/initiation of orders/transactions, and a seller module 112 to enable sale of financial instruments such as bonds/shares. In an implementation, a transaction is started, typically as a session, every time a trader places a booking order through an OMS interface such as 104A. There may be thousands of traders initiating one more transactions every minute from different places or using different terminals. Such financial transactions can be managed by one or more order management systems, such as 108A and 108B, which may be collectively or individually referred to as system(s) 108. For instance, as shown in FIG. 1, buyer module 110 of the interface 104A can be configured to use order management system 108A. In an exemplary implementation, there may be an order management system for managing one or more companies/firms/customers, or there can be an individual company/firm that may have one or more order management systems, and therefore any such configuration/construction/design is completely within the scope of the instant disclosure. Similar to trader 102A and interface 104A on the buy side, there can be trader 102B connected through OMS interface 104B having a seller module 112 configured to enable placement of an offer to sell shares or bonds. Trader 102B may be connected, through interface 104B, to order management system 108B. These order management systems 108 can be connected to a centralized secure repository, such as a secure repository 106 that stores and executes offers of buyers and sellers securely. All financial transactions between a company/customer/firm such as 102 and secure repository 106 can be configured as secured transactions using the FIX protocol. Using the FIX protocol, customers/companies/traders including any other stakeholders such as customer session managers are configured to communicate with each other to exchange electronic messages formatted according to the FIX communications standard. These session managers also take care of and ensure the messages exchanged between order management system 108 and customer trading system such as 104 are secure and reach their destinations with integrity. Although FIX is a preferred standard for these communications, it should be apparent to those skilled in the art, upon reading this disclosure, that various other protocols and standards (e.g., those of the Society for Worldwide Interbank Telecommunication (SWIFT)) may be employed to handle data communications between order management system 108, customer trading system 104, and provider trading system. The data transmitted over interface link also may be encrypted for security purposes. For purposes of simplicity, only a few traders and order managements systems are illustrated in FIG. 1, whereas, one should appreciate that in an actual implementation, there may be thousands of such companies/traders placing orders to buy and sell the bonds/shared/instruments, or may be engaged in other financial transactions. As the number of companies connected with the centralized secure repository 106 and with the order management systems increases, load on the server increases, which may create transactional latency as described above. Such transactional latency is not tolerable by traders, who stand to make or loose thousands of dollars in the face of even the smallest time delay in a financial transaction, as such financial transactions are highly time sensitive, and therefore the customers/firms/traders simply cannot incur any unwanted transactional delays. To manage such transactional latency, the centralized trading management system may have several servers executing these financial transactions. An example implementation described herein relates to managing a large number of such financial transactions using load balancing among multiple transaction servers.

Figure 2:
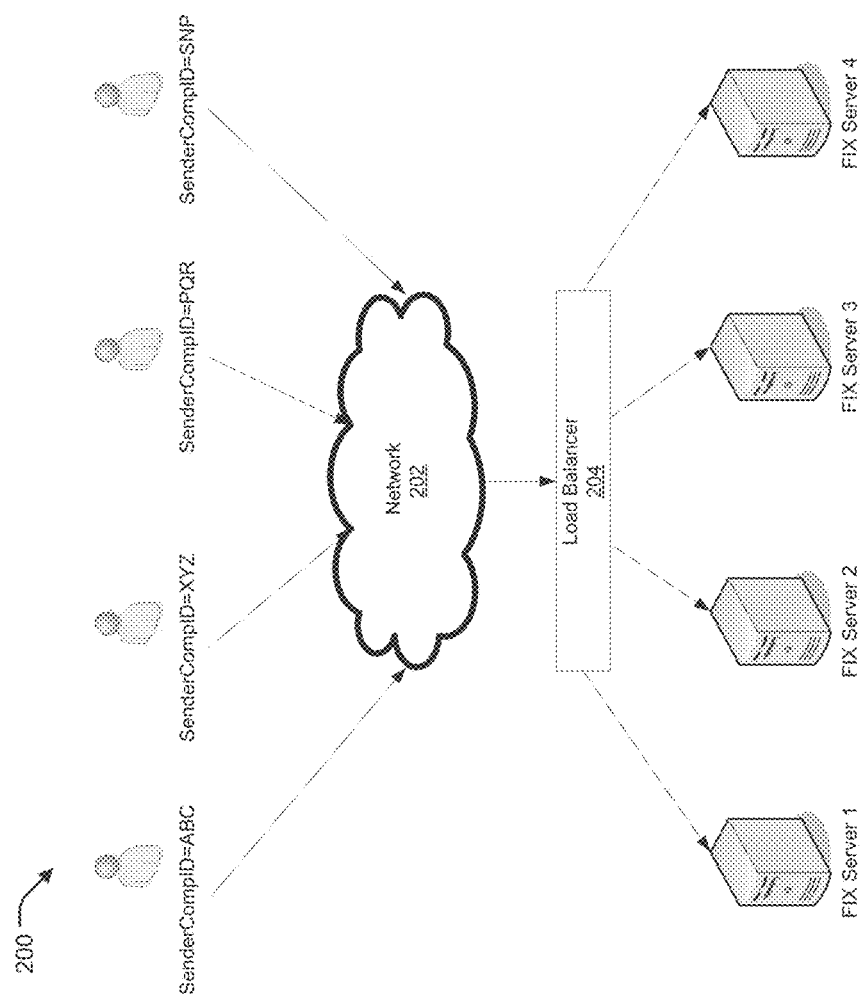
FIG. 2 illustrates an exemplary trading architecture in which session/transaction requests are processed by a load balancer in accordance with an embodiment of the present invention.

FIG. 2 illustrates an exemplary trading architecture 200 in which session/transaction requests are processed by a load balancer 204 in accordance with an embodiment of the present invention. In an implementation, for each transaction initiated by a trader, system/architecture 200 can initiate a financial transaction session using the FIX protocol, where a typical packet of the FIX protocol includes a field for "SenderCompID", also hereinafter referred to as COMP-ID, which can be used by a centralized trading management system to identify the source company/firm/customer/financial institution from which the request originated. As illustrated in FIG. 2, system 200 can include multiple companies/financial institutions having their identifiers as ABC, XYZ, PQR, and SNP, defined in the SenderCompID fields of packets initiated by them, wherein such companies can initiate a financial transaction using the FIX protocol. As illustrated, the value inside the packets of the transaction session for SenderCompID can be updated as SenderCompID=ABC, SenderCompID=XYZ, SenderCompID=PQR and SenderCompID=SNP for the companies ABC, XYZ, PQR and SNP respectively.

During initiation of a transaction session, financial transaction packets from a given company/trader/user can be received through a network, such as ultra low latency network 202 by load balancer 204, which can extract SenderCompID (SID) field from the incoming packet to determine the company responsible for sending the packet. Based on the determined company/customer identifier SenderCompID (SID), load balancer 204 can determine a customer weight (also referred to as a customer weighting factor) corresponding to extracted SID, where the customer weighting factor is an indicator of past network/transaction activity of the customer, including, but not limited to bandwidth consumed, volume of transaction, type of transactions and frequency of transactions. In one embodiment, the customer weighting factor may simply be computed as the average number of transactions carried out per day. The load balancer 204, which is operatively coupled with multiple processing FIX servers, such as Server 1, Server 2, Server 3, and Server 4, among other like servers, can then, based on the determined customer weighting factor and each server's load factor, assign an appropriate server to the customer and/or the financial transaction/session thereof. For instance, a customer having a higher customer weighting factor, indicative of a relatively higher resource consumption/requirement, can be assigned a server having high processing capability. Each session of a customer/company with a server can be identified by means of a session identifier, which in an embodiment, can be created by concatenating the Sender and Target Companies and Sub IDs (SendercompID:SenderSubId-TargetCompID:TargetSubID) in order to uniquely identify the FIX session to which a given FIX message belongs.

Figure 3:
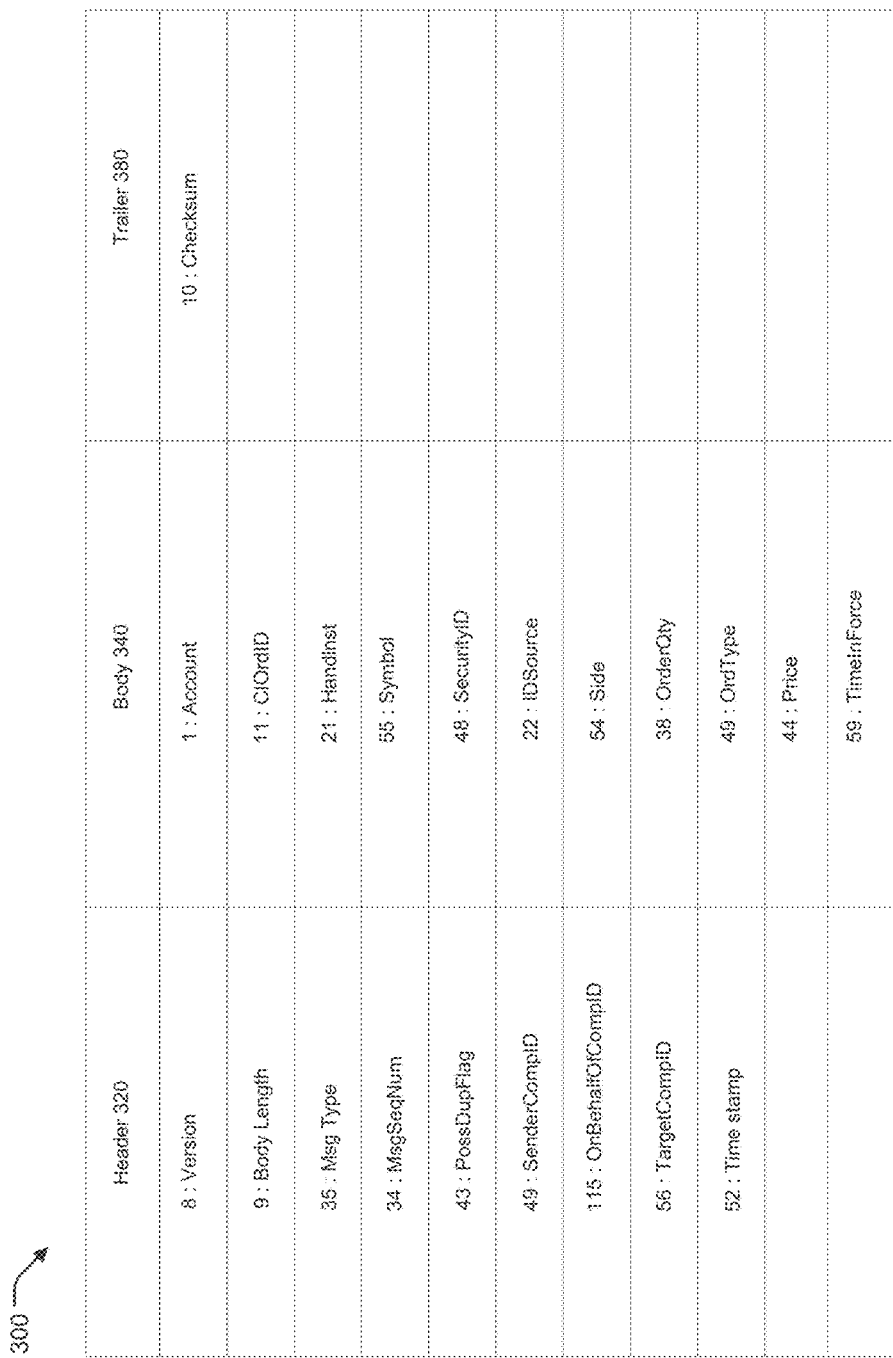
FIG. 3 illustrates format of a FIX protocol based packet.

FIG. 3 illustrates a format 300 of a FIX protocol based packet. A typical FIX packet/message contains a header section 320, a body section 340, and a trailer section 380, which can be represented in a <TAG>=<VALUE><DELIMITER> ASCII format. The header section 320 can include several fields such as field "8:version" to define a version of FIX protocol being used, "9:Body Length" to indicate a length of the FIX message, "35:Msg Type" to define a type of message being carried by the packet, "34:MsgSeqNum" to define a message sequence number where multiple messages may be related to a single transaction session, "43:PossDupFlag" to indicate a possible duplicate message, "49:SenderCompID" to indicate the source company, "115:OnbehalfofCompID" to indicate the name of the company on behalf of whom the present transaction may have been initiated, "56:TargetCompID" to indicate a target financial institution to whom the message is target, and "52:TimeStamp" to indicate a time and date at which the transaction was initiated by the trader. Header section 320 of the FIX message 300 may also contain other fields to indicate other information and metadata related to the financial transaction. FIX therefore identifies customers based on TargetCompID (tag 56), SenderCompID (tag 49), and OnBehalfOfCompID (tag 112). Each unique session can be defined by any one of the identifiers mentioned above or a combination of them.

Body section 340 of the packet/message can include a field "1:account" indicating a trading account number of the trader, "11:CIOrdID" indicating a client order ID, "21: HandInst" indicating identification information for the financial institution handling the transaction, "55:Symbol" indicating a symbol of the company whose shares the trader wants to sell or to buy (for example Symbol=IBM"), "48: SecurityID" indicating a security ID, "54:Side" indicating whether the transaction is being initiated by the buyer side or the seller side, "38:OrderQty" indicating a quantity (e.g., a number of shares or units), "40:OrdType" indicating a type of order (e.g., a market order, a limit order or a stop order), "44:price" indicating a quoted price of the security, and "59:TimeInForce" indicating a time by which the present price may be in forced or valid. The body section 340 of the message may contain other fields related to session and application data.

Trailer section 360 may contain fields, such as "10: Checksum" to detect errors in the packet/message that may have occurred during transmission. These fields on the message may be used by the trading management system to analyze the request and take one and more actions based on the values of the fields. In an instance, for a transaction initiated by a trader "XYZ" to buy 5000 shares of IBM at a price of $120.75, the FIX message may be represented as:

8=FIX.4.2^9=251^35=D^49=FUNDMGR-
A^56=BROKER-A^34=2^52=20140517-12:
39:15^11=9876^21=1^55=IBM^54=1^60=20140517-
12: 45:15^38=5000^40=2"44=120.75^10=127.

The message can be parsed and/or interpreted by the load balancer and/or the financial management server. With reference to the above example, the value of field 8 ("FIX.4.2") of the above message indicates that the requesting trader is using version 4.2 of the FIX protocol, the value of field 9 ("251") indicates that the length of the body of the message is 251 bytes, the value field 35 ("D") indicates a new message, the value of field 49 ("FUNDMGR-A") is the name of the fund manager, the value of field 56 ("BROKER-A") is the of the broker who is acting on behalf of the fund manager, the value of field 52 ("20140517-12:39:15") indicates the date and time (i.e., May 17, 2014 at 12:39:15 PM) at which the order was placed, the value of field 11 ("9876") represents the ID of the client, the value of field 21 ("1") indicates a private, automated execution order with no broker intervention, the value of field 55 ("IBM") indicates the trading symbol of International Business Machines Corporation, whose shares are being booked, the value of field 54 ("1") indicates that a buyer has initiated the process, the value of field 60 ("20140517-12:45:15") indicates a time and date by which the present trader wants to buy the share at the given price, the value of field 38 ("5000") indicates that the trader desires to purchase 5,000 shares of IBM stock, the value of field 44 ("120.75") indicates the price at which the trader wants to book the shares, and the value of field 10 ("127") represents the checksum value for the message. Different fields of FIX messages may be used by trading management system of the present disclosure for different purposes. For example, in one embodiment of the present invention, field SenderCompID may be used to determine the company/customer responsible for sending the packet/FIX message, and to assign a server for executing the intended transaction based on the weight/usage pattern of the determined company/customer/firm.

Figure 4:
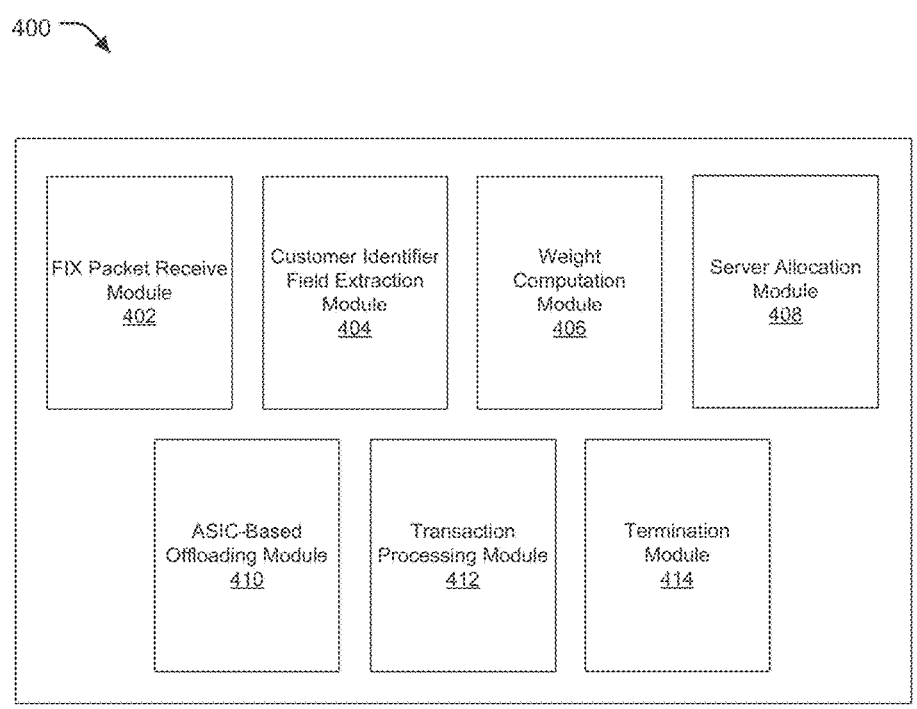
FIG. 4 illustrates exemplary functional modules of a financial transaction session management load balancer in accordance with an embodiment of the present invention.

FIG. 4 illustrates exemplary functional modules of a financial transaction session management load balancer system 400 in accordance with an embodiment of the present invention. In the present example, load balancer 400 may be implemented by means of one or more processors, a communication interface device, and one or more machine-readable storage medium (e.g., internal data storage devices) tangibly embodying thereon instructions, which may be used to program the processors to perform the processing of FIX protocol packets as described herein. The instructions may implement one or more of a FIX packet receive module 402, a company identifier field extraction module 404, a weight computation module 406, a server allocation module 408, an, a transaction processing module 412, and a termination module 414.

FIX packet receive module 402 can be configured to receive one or more FIX packets of a FIX session relating to a transaction that is intended to be processed. Depending upon the particular implementation, module 402 can be implemented as part of a load balancer or another system that is operatively coupled with the load balancer to facilitate receiving/processing of FIX packets from one or more companies/traders/customers/brokers/users, all of which may be the same or different entities. FIX sessions can initially be created by clients/traders using one of the client interfaces from multiple client interfaces. In one embodiment, the FIX packet receive module 402 can be configured to receive only the first FIX packet of a transaction in order to conduct further processing for load balancing or can be configured to receive multiple initial packets from the same transaction.

Company identifier field extraction module 404 can be configured to identify a company/customer of multiple customers of a particular order management system based on a value of a SenderCompID field of the received FIX packet so as to determine/retrieve details of the sender of the packet. Each company may have one or more SenderCompID values associated therewith. In one embodiment, a database lookup may be performed to retrieve desired information regarding the sender of the FIX packet based on the extracted SenderCompID field. Those of ordinary skill in the art will appreciate that although various embodiments of the present disclosure relate to use of sender information determined based on the SenderCompID field value, other means of identifying the sender of received FIX packets are within the scope of the invention. For example, other of the unique fields could be used, including, but not limited to, OnBehalfOfCompID, Account(Body) to identify and balance based on other parameters of the client (e.g., TargetCompID and/or HandInst(Body), if a single location or server farm where used to hold multiple operating exchanges.

Weight computation module 406 can be configured to determine a customer weighting factor to facilitate load balancing. In one embodiment, a company or broker performing a large volume of transactions regularly will have a higher weighting factor than one performing a lower volume. In accordance with one embodiment, the general idea is to both balance all comp-ids associated with a particular client to the same server and allocate more resources to heavy users by limiting the number of heavy users balanced to a specific server.

According to one embodiment, the customer weighting factor is a decimal value that is indicative of the amount of resources generally used by the customer. The customer weighting factor can be based on previously observed (e.g., historical) usage patterns of resources by the customer and/or statistical parameters (e.g., averages, moving averages, cumulative moving averages, weighted moving averages, means, medians, modes, ranges, standard deviations, etc.) relating thereto. The usage patterns and statistical parameters can include or be computed based on network usage parameters and/or transaction related parameters, including, but not limited to, length of transactions, number of transactions, frequency of transactions, number of orders/transactions per unit of time, volume of transactions per session, number of sessions, average bandwidth consumed in each session and aggregate number of sessions. Depending upon the particular implementation, resources utilized/processed by a company/customer can be based on the number, volume, scale, type, among other attributes/characteristics of transactions/sessions in which the customer is typically involved. A company or broker performing a large volume of transactions regularly may therefore have a higher weighting factor or can even be assigned weight depending on how weight are defined/configured by the proposed system. Such weights can either be stored in memory of the load balancer, or in any other system/memory that can be operatively coupled with the load balancer for enabling the load balancer to retrieve the weight of a defined customer/company whenever desired. Such customer weight can be updated/modified at periodic intervals or can be done continuously/real-time so as to enable accurate usage representation of the customer/company to be retrievable for analysis. Load balancer can also be enabled to access historic weights of a company and assess the changes that have taken in the weights over a defined period of time to evaluate the reason for such changes, which can help the balancer accurately understand the kind/type/manner/mode of transactions that the company is likely carry out and accordingly allocate a server or combination thereof. According to one embodiment, the customer weighting factor is calculated as follows:

Weighting Factor=(# of Orders*Average Complexity of Orders)/Time

Server allocation module 408 can be configured to assign the customer to a server selected from multiple backend servers of a high frequency trading (HFT) platform based on the weighting factor and a current load factor associated with the selected server. Assignment of the customer in the context of the present example can be also interpreted to mean assignment of the transaction/session of which the packet at issue is a part to the most appropriate server (e.g., a least loaded server). Upon assignment of a transaction/session/customer to a server, the current load factor of the assigned server can be increased based on the weighting factor of the customer in context, and therefore, module 408, implemented in, for instance, the load balancer, can be configured to keep an accurate measure of the existing/current load on each server so as to determine an appropriate server depending on information regard the current load factor of each available server and the incoming customer's weighting factor. In one embodiment, the selected server is the least loaded server of those available. In another embodiment, the selected server may not be the least loaded server but rather the server that is the least loaded of those that have the capability to handle the volume and types of transactions that are expected to be received from the customer.

ASIC-based offloading module 410 can be configured to offload a Transmission Control Protocol (TCP) flow associated with the FIX session to a Network Processor (NP) Application Specific Integrated Circuit (ASIC). In an exemplary implementation, such offloading can be initiated once a server has been assigned to the incoming financial transaction packet. This offloading process is thought to accelerate the TCP/IP connection. In one embodiment, TCP offloading can be implemented by mapping TCP sequence numbers of the FIX packet and the subsequent FIX packets to spliced sequence numbers of the NP ASIC. In another embodiment, TCP processing complexity can be offloaded from a host CPU to specialized TCP accelerators. Usually, an accelerating TCP offload engine (TOE) is a dedicated subsystem co-located with the host CPU or can be a special-purpose programmable hardware device that is connected to the TCP server over a high-speed link. In an implementation, NP-based TOE combines low cost and flexibility of a general-purpose processor with the speed and scalability of custom silicon solutions. Furthermore, the NP offloads both memory-intensive and CPU-intensive processing from the TCP server. In the NP-based TOE mechanism, TCP splicing can be used to enhance TCP performance, wherein in TCP splicing two independent TCP connections span a session: one from the client/customer/company to the NP, and the second from the NP to the server. Data from the server can be locally acknowledged by the NP, thereby reducing server buffering requirements and speeding up congestion window growth. NP can buffer the data until the acknowledgment (ACK) from the far end (client) arrives. In the absence of an acknowledgment, the NP performs timer management to retransmit TCP segments toward the far end. The usage of local acknowledgments also shields the TCP server from any network congestion and excessive delays between the NP and the client. This reduces the memory burden at the server.

In one embodiment, a transaction processing module 412 can be configured to process subsequent FIX packets of the FIX session through said NP ASIC until the financial transaction(s) are complete or the sessions is disconnected/discontinued.

Termination module 414 can be configured to release all handles/pointers/sessions and de-allocate all memory. Module 414 can further be configured to decrease the server load factor based on the customer weighting factor once the transaction is complete. Module 414 can further be configured to store usage pattern data representative of the current transaction to a database for use in connection with updating the customer weighting factor. If a session is terminated due to a failure, an alternative server may be identified as described above to take over for the failed server.

Figure 5:
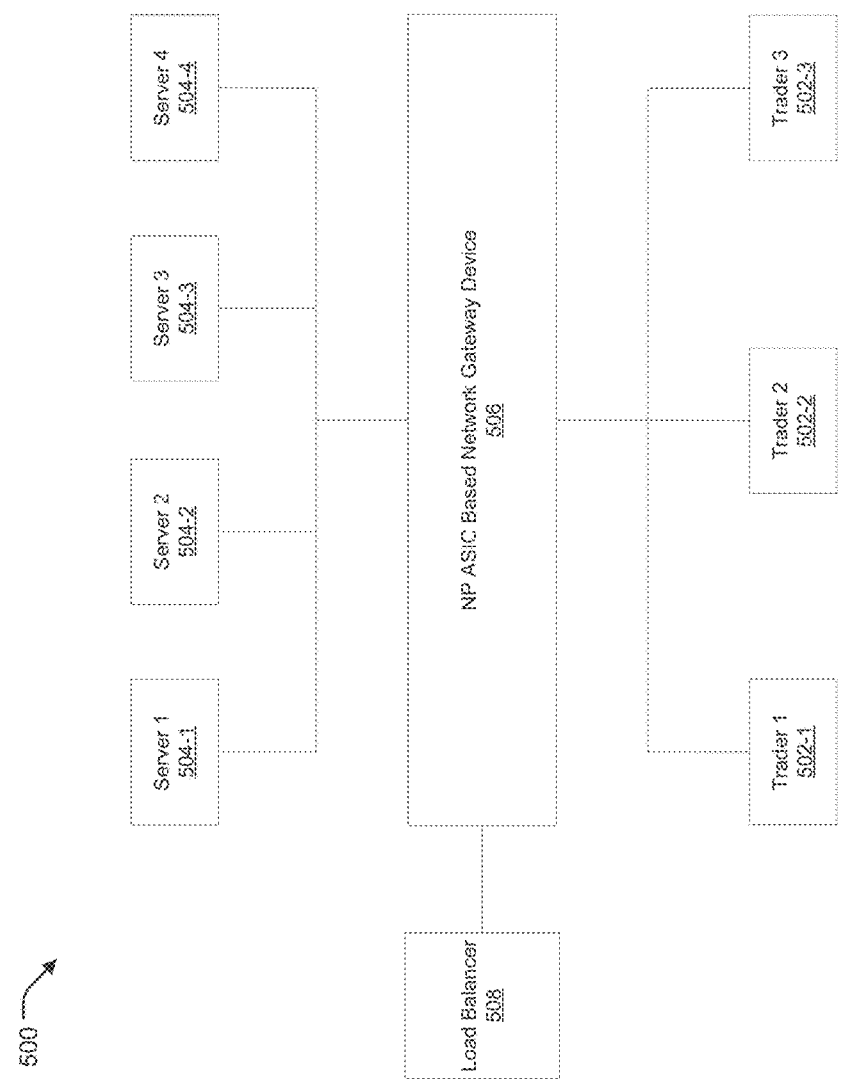
FIG. 5 illustrates an exemplary system architecture in accordance with an embodiment of the present invention.

FIG. 5 illustrates an exemplary system architecture 500 in accordance with an embodiment of the present invention. In the context of the present example, architecture 500 includes multiple financial institutions/traders/customers/companies such as trader 502-1, trader 502-2, trader 502-3, which may be collectively or individually referred to as trader(s) 502, that are operatively coupled with a load balancer 508 through a network appliance, such as an NP ASIC based network gateway device 506. Architecture 500 further includes multiple servers, such as server 504-1, server 504-2, server 504-3, and server, 504-4, which may be collectively or individually referred to as server(s) 504, which can be also be operatively coupled with load balancer 508 through NP ASIC device 506 to execute transactions as initiated by traders 502. In one embodiment, load balancer 508 selects a server from among servers 504 based on a weighting factor associated with the customer/company/financial institution from which the transaction request is received and further based on the current load of each server available for allocation.

In one embodiment, NP ASIC-based network gateway device 506 can be configured to accelerate TCP/IP connection processing by allowing load balancer 508 to offload a TCP flow associated with the FIX session to a NP ASIC of NP ASIC-based network gateway device 506. Such offloading can be initiated once a server 504 has been assigned to the incoming financial transaction packet. TCP offloading can be implemented by mapping TCP sequence numbers of the FIX packet and the subsequent FIX packets to spliced sequence numbers of the NP ASIC.

Figure 6:
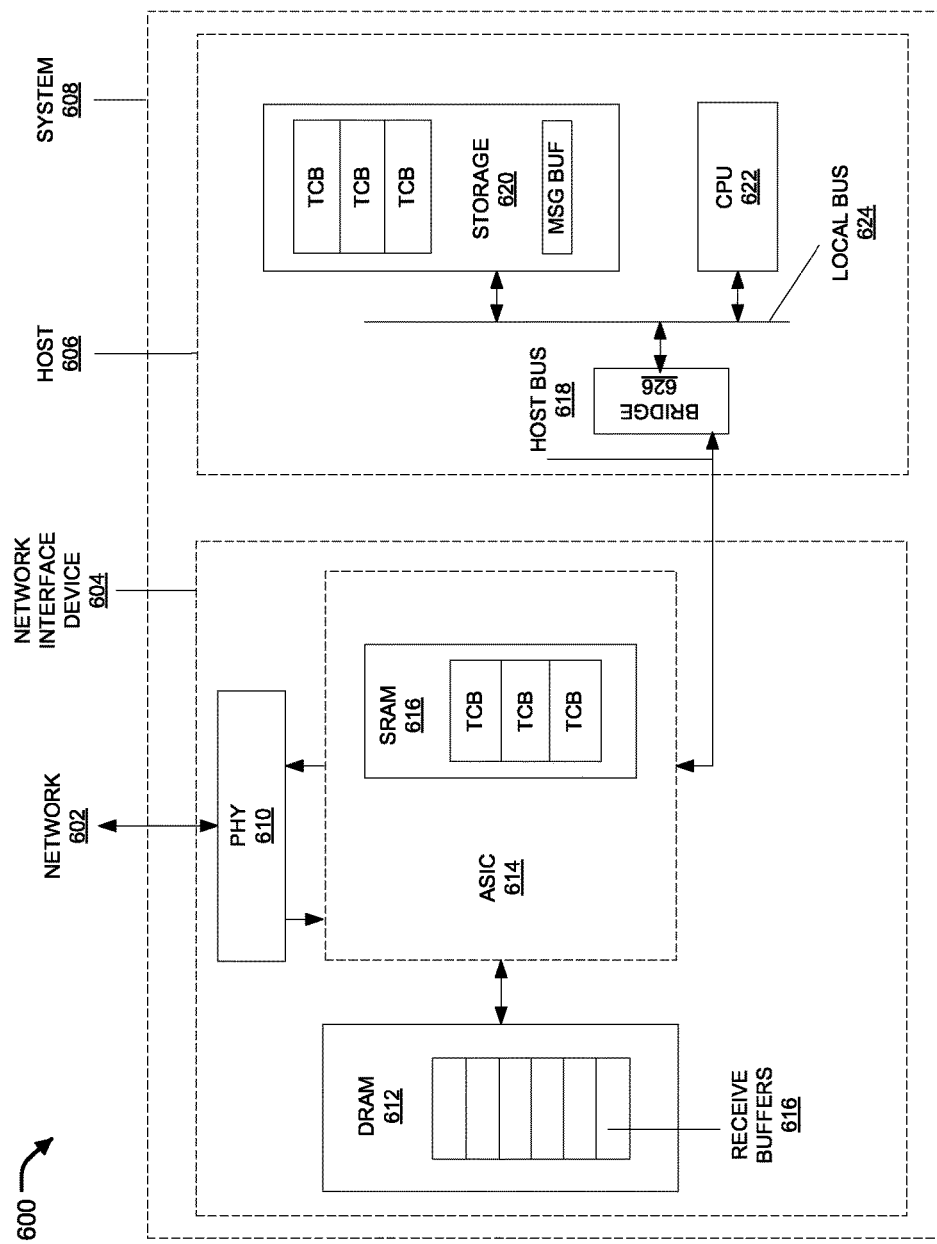
FIG. 6 illustrates exemplary offloading of TCP flows to a network processor ASIC in accordance with an embodiment of the present invention.

FIG. 6 illustrates exemplary offloading of TCP flows to an NP ASIC 614 in accordance with an embodiment of the present disclosure. In the context of the present example, an NP processor offloads a specific session once the FIX protocol SenderCompID for that session has been identified, thereby reducing latency for the remainder of the session to around 5 uS. Once a load balancer identifies the FIX protocol SenderCompID for a particular packet, it does not need to inspect the packet further before scheduling it to the same server to which the load balancer assigned earlier packets associated with this session.

Initial TCP packets can be inspected by a CPU based load balancer, and then moved into NP ASIC 614 to reduce latency for the reminder of the session. Instead of inspecting every packet by the load balancer, embodiments of the present invention can inspect only the initial packet of each session and then offload the rest of the packets of the flow to NP ASIC 614. Once the load balancer determines an appropriate server to which to assign a specific session based on the identified SenderCompID from the initial message/packet of the session, it offloads subsequent messages to NP ASIC 614 to enable low latency processing of the transaction.

FIG. 6 represents an exemplary portion of an offloading architecture of an HFT platform, where TCP traffic is offloaded from a load balancer (not shown) that is operatively coupled with NP ASIC 614 by means of a network interface device 604. NP ASIC 614 is in turn operatively coupled with the selected/host server 606 for accelerating data transfer and offloading time-intensive processing tasks. ASIC 614 can include an SRAM 616 to temporarily store one or more TCP packets, and can also be operatively coupled with a DRAM 612 configured as receive buffers. Packets received at the network interface device 604 at its physical interface PHY 610 can be temporarily stored in DRAM 612, where PHY 610 of the network interface device 604 can be connected to network 602 to receive requests from one or more traders. The received packets can be stored in receive buffers 616 in the DRAM 612 of the network interface device 604. After allocating an appropriate server to a session based on the customer weighting factor, subsequent messages of that session can be offloaded by the load balancer to the ASIC 614.

In one embodiment, ASIC 614 can be connected to server 606 by means of a bridge 626 through a host bus 618. TCP packets/messages received at host server 606 can be stored within a message buffer in storage 620 that is connected to the bridge 626 through a local bus 624 of server 606. CPU 622 of host server 606 can execute the transaction as initiated by the trader. TCP flow offloading to ASIC 614 provides a fast transaction as it reduces the burden from the load balancer to inspect each and every packet that may be related to the same session or same company.

Figure 7:
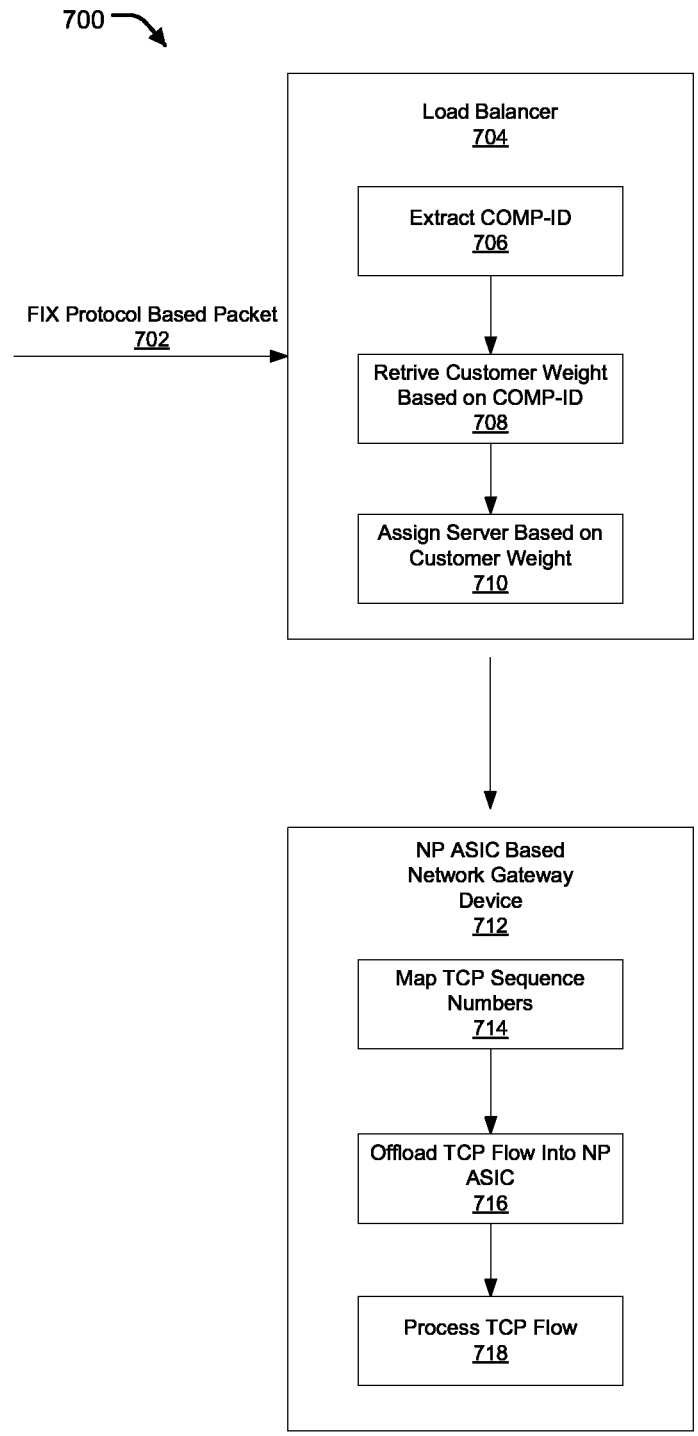
FIG. 7 illustrates an exemplary block diagram showing management of financial session transaction in accordance with an embodiment of the present invention.

FIG. 7 illustrates an exemplary block diagram 700 showing management of financial session transaction in accordance with an embodiment of the present invention. In the context of the present example, a network interface device may include both, a CPU based load balancer 704 component, as well as an NP ASIC based network gateway device 712. The network interface device/unit can receive one or more FIX protocol based packets 702 relating to a given financial transaction, where the load balancer 704 can extract COMP-ID 706 from the received packet(s), retrieve the current company weighting factor based on the extracted COMP-ID 708, and assign a server at 710 based on the retrieved company weighting factor and also a current load factor of each assignable server. As described above, a current customer weighting factor may be periodically determined or updated in realtime based on observed usage patterns of the identified company/customer/financial institution. Load balancer 704 may then assign the FIX session to a server at 710 based on the current customer weighting factor and the current load factors of available servers. Once the server has been assigned to the financial transaction/session, subsequent messages/packets may be offloaded to/handled by NP ASIC based network gateway device 712, where the NP ASIC device 712 maps TCP sequence numbers as illustrated at 714 in a temporary storage, offloads the TCP flow to the NP ASIC 712 as illustrated at 716, and process the TCP flow at NP ASIC 712 illustrated at 718. In an implementation, TCP packets can be forwarded to an appropriate server, as previously selected by the load balancer, simply by checking the COMP-ID, wherein all transaction packets/messages received from the customer/institution can be forwarded to the mapped/assigned server.

Figure 8:
FIG. 8 illustrates an exemplary table showing servers allocated to various sessions initiated by customers in accordance with an embodiment of the present invention.

FIG. 8 illustrates an exemplary table 800 showing servers allocated to various sessions initiated by customers/traders/institutions in accordance with an embodiment of the present invention. In the context of the present example, load balancer may maintain a logical table as illustrated in FIG. 8 to keep track of the transactions/sessions initiated by various traders/companies/customers along with the server to which such transactions/sessions have been assigned. In one embodiment, table 800 can include a customer detail field 810, a customer weight field 820, a customer identifier field 830, and an allocated server field 840. Those skilled in the art will appreciate that such a representation is completely logical in nature and the load balancer may or may not have any such representation, or can have a representation that is completely different from what is being shown with respect to exemplary table 800. Any such representation or mode of keeping track of each customer, its weight, and the server to which it is associated is completely within the scope of the instant disclosure.

Continuing with the present example, as shown in table 800, customer detail can include, but is not limited to, a customer name or a name and details of a trader, a financial instrument, a customer, a company, a broker, a trader, among other applicable stakeholders. As mentioned above, each customer/company can have a corresponding weighting factor that is computed based on past usage patterns and history of financial transactions/network attributes of the customer. For instance, customer 3 has a weighting factor of 0.6, and customer 7 has a weighting factor of 0.55, which can, in an interpretation mean that customer 3 has more financial transaction activity in terms of one or a combination of frequency, volume, number of sessions, number of transactions/day, bandwidth consumed, among other like parameters.

Similarly, each customer can be associated with a customer identifier (CUST-ID) that can be retrieved from SenderCompID field of the FIX protocol packet. In the FIX protocol, a customer may have multiple customer identifiers, but a particular customer identifier can only be associated with one customer. For instance, customer 3 can have two customer identifiers, namely CUSTID_3 and CUSTID_31, which can be taken into account by the load balancer to identify that the aggregate/average/applicable weight of customer 3 is 0.6. Similarly, the weighting factor of customer 4, which transmits customer identifier CUSTID_4 within the SenderCompID field of FIX packets it originates, is 0.25. Similarly, any new transaction initiated by a new or an existing customer can be entered into the logical table 800 to show the identifier of the customer along with the weight of the customer. At the same time, the server assigned to each transaction/session of a customer can be shown/represented in the table, such as, for instance, server 1 is assigned to customers 3, 6, 8, and 10. Those of ordinary skill in the art will appreciate that any other detail can also be included in the table such as load factor of the server, and all such details, irrespective of their mode/manner/type of representation, are completely within the scope of the present disclosure.

Figure 9A:
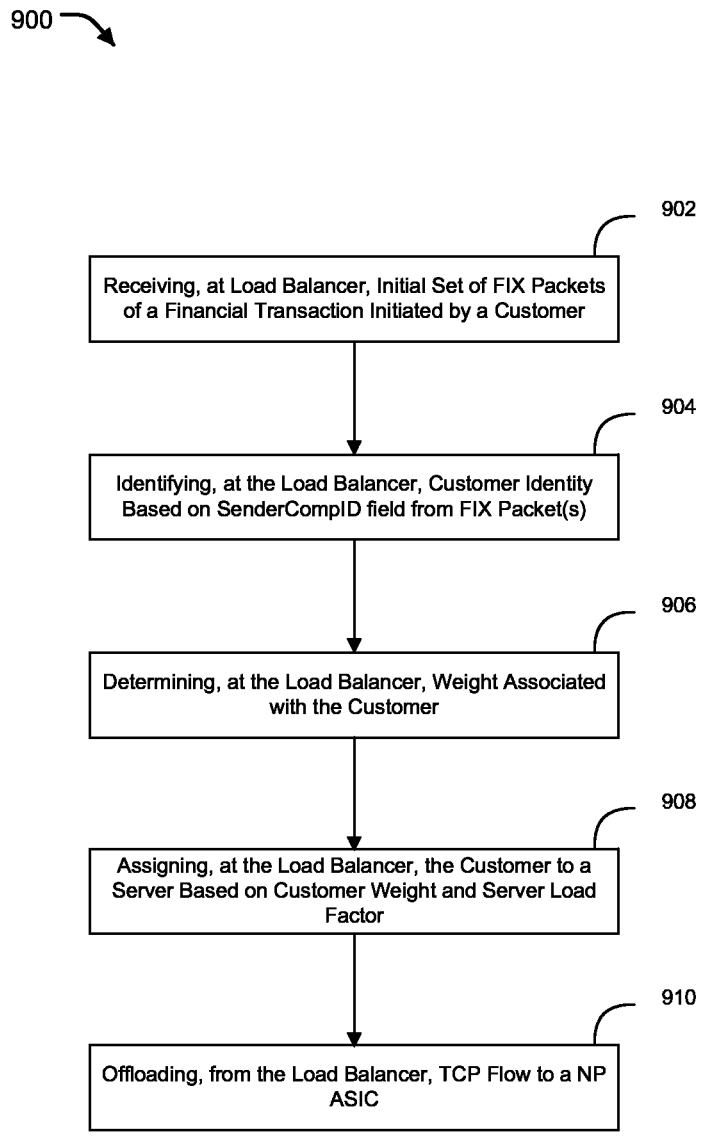
FIGS. 9A and 9B illustrate exemplary flow diagrams for executing/terminating financial transactions with low latency in accordance with an embodiment of the present invention.

FIG. 9A illustrates an exemplary flow diagram 900 for executing financial transactions with low latency in accordance with an embodiment of the present disclosure. At step 902, load balancer receives an initial set of one or more FIX packets as part of a FIX transaction/session from a customer. In an embodiment, the load balancer can be operatively coupled to multiple backend servers of a high frequency trading (HFT) platform. At step 904, the load balancer identifies the customer based on a SenderCompID field value that is extracted from the incoming FIX packet(s). At step 906, the load balancer can retrieve/determine a customer weighting factor of the identified customer. As discussed above, the customer weighting factor may be based on a previously ascertained usage pattern of resources by the customer. At step 908, the load balancer assigns the customer to a server selected from the available servers within the HFT platform based on the customer weighting factor and current load factors associated with the available servers. After assignment, the load factor of the server to which the FIX session is assigned can be updated to reflect an increased load by adding the customer weighting factor to the load factor. This enables the load balancer to make accurate load balancing decisions for subsequent financial transactions. In real-time or upon termination of the current financial transaction, the weighting factor of the customer can be also updated/modified based on the transaction processing of the current FIX transaction. At step 910, the TCP flow associated with the FIX session can be offloaded by the load balancer to an NP ASIC to enable processing of further packets by the NP ASIC in order to reduce latency in processing.

Figure 9B:
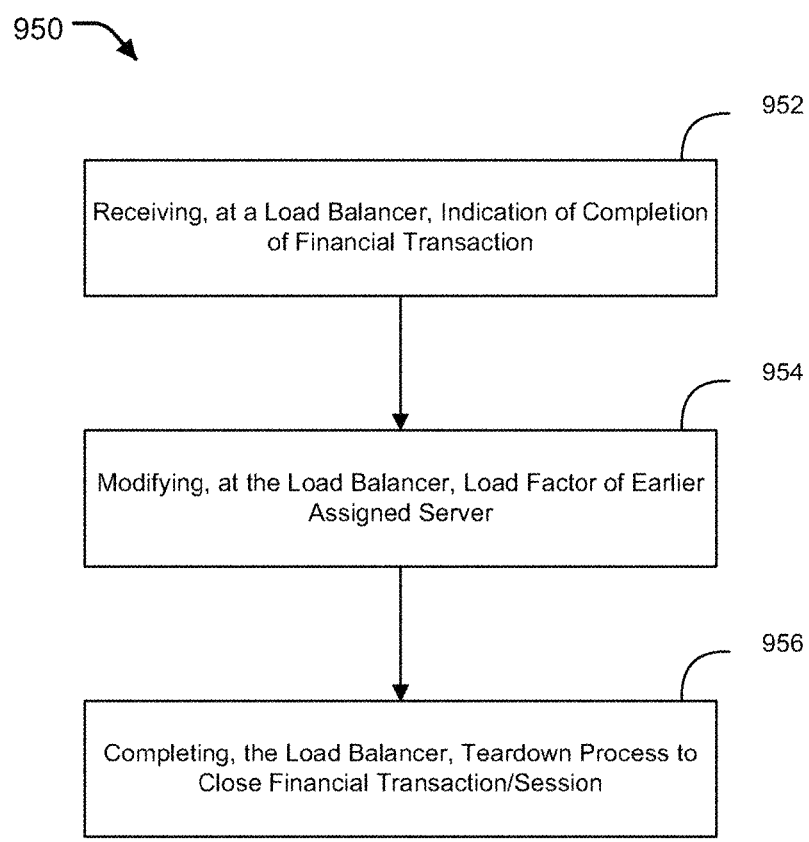

FIG. 9B illustrates an exemplary flow diagram 950 for terminating a financial transaction/session in accordance with an embodiment of the present disclosure. At step 952, load balancer can receive an indication of completion of the financial transaction session. At step 952, the load balancer or any other appropriate network element can terminate the session with the server through the NP ASIC and update its records accordingly. At step 954, the load factor of the server to which the now completed financial transaction/session was assigned can be modified/reduced to reflect the reduced load of the server. The customer weighting factor can also be updated at this time to reflect resources used by the now completed financial transaction/session. Alternatively, resource usage data may simply be stored for later batch processing. At step 956, the teardown process is completed to close the financial transaction/session.

Figure 10:
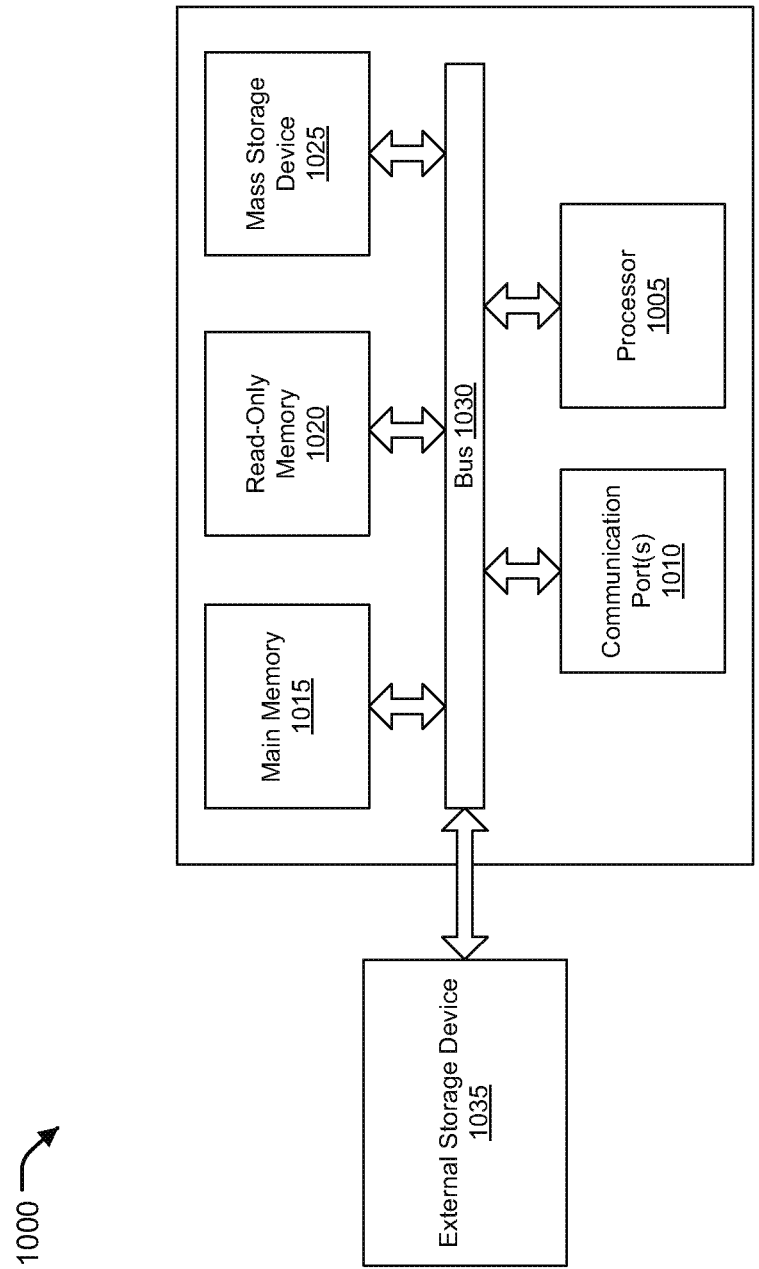
FIG. 10 is an exemplary computer system in which or with which embodiments of the present invention may be utilized.

FIG. 10 is an exemplary computer system in which or with which embodiments of the present invention may be utilized. Computer system 1000 may represent or form a part of a load balancer, an NP ASIC based network gateway device, a server or a trader workstation.

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 1000 includes a bus 1030, a processor 1005, communication port 1010, a main memory 1015, a removable storage media 1040, a read only memory 1020 and a mass storage 1025. A person skilled in the art will appreciate that computer system 1000 may include more than one processor and communication ports.

Examples of processor 1005 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 1005 may include various modules associated with embodiments of the present invention.

Communication port 1010 can be any of a 10/100 Ethernet port, a Gigabit, 10 Gigabit, 40 Gigabit, 100 Gigabit port or the like using copper or fiber, a serial port, a parallel port, or other existing or future ports. Communication port 1010 may be chosen depending on a network, such a Local Area Network (LAN), Wide Area Network (WAN), or any network to which computer system 1000 connects.

Memory 1015 can be Random Access Memory (RAM), or any other dynamic storage device commonly known in the art. Read only memory 1020 can be any static storage device(s) such as, but not limited to, a Programmable Read Only Memory (PROM) chips for storing static information such as start-up or BIOS instructions for processor 1005.

Mass storage 1025 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 1030 communicatively couples processor(s) 1005 with the other memory, storage and communication blocks. Bus 1030 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1005 to system memory.

Optionally, operator and administrative interfaces, such as a display, keyboard, and a cursor control device, may also be coupled to bus 1030 to support direct operator interaction with computer system 1000. Other operator and administrative interfaces can be provided through network connections connected through communication port 1010.

Removable storage media 1040 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, to avoid obscuring the present invention.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "determining", "adjusting", "applying", "creating", "ranking," "classifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present invention also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should therefore be determined with reference to the appended claims, along with the full scope of equivalents to which such claims are entitled.

What is claimed is:

1. A method comprising:
   maintaining, by a high frequency trading (HFT) platform:
   weighting factor information for a plurality customers of the HFT platform by tracking historical resource usage patterns for the plurality of customers including for each customer of the plurality of customers, observing Financial Information eXchange (FIX) sessions associated with the customer and updating a weighting factor for the customer as a function of one or more of network bandwidth used by the customer, a number of FIX sessions initiated by the customer, a volume of transactions requested by the customer per FIX session and an average number of transactions carried out by the customer during a predetermined timeframe;
   load information for a plurality of servers of the HFT platform, by tracking FIX sessions assigned to the plurality of servers and increasing a load factor for a particular server of the plurality of servers by (i) responsive to assignment of a particular FIX session associated with a particular customer to a particular server, increasing the load factor by the weighting factor for the particular customer and (ii) responsive to completion of the particular FIX session, decreasing the load factor by the weighting factor; and
   assignment information indicative of a particular server of the plurality of servers to which one or more FIX sessions of a particular client have been assigned by a load balancer fronting the plurality of servers; and
   receiving, by a host central processing unit (CPU) of the load balancer, a FIX packet of a FIX session relating to a transaction;
   identifying, by the host CPU of the load balancer, a customer of the plurality of customers associated with the FIX session by evaluating a value of a SenderCompID field of the FIX packet;
   when the FIX packet represents a first packet of a transport protocol flow associated with the FIX session and the assignment information indicates the customer is not assigned to any of the plurality of servers, performing, by the host CPU of the load balancer, load balancing processing, including:
   determining a weighting factor of the customer with reference to the weighting factor information;
   assigning the customer to a server of the plurality of servers by identifying a server of the plurality of servers that can accommodate the weighting factor based on the load information; and
   accelerating the transport protocol flow by offloading the transport protocol flow to a specialized transport protocol accelerator in a form of a network processor (NP), representing a dedicated subsystem of the load balancer colocated with the host CPU that is implemented in a form of an Application Specific Integrated Circuit (ASIC), by causing the NP to establish two independent transport protocol connections for the transport protocol flow, including a first transport protocol connection with a client device associated with the customer and a second transport protocol connection with the assigned server;

when the FIX packet represents a second or subsequent packet of the transport protocol flow or the assignment information indicates the customer is assigned to the assigned server:

avoiding the load balancing processing, by forwarding, by the host CPU of the load balancer, the FIX packet to the NP for processing; and wherein the NP reduces buffering requirements of the assigned server and shields the assigned server from transmission delays between the NP and the client device, by locally acknowledging data received by the NP from the assigned server on behalf of the client device and buffering the data received until the data received has been acknowledged by the client device.

2. The method of claim 1, wherein the assigned server is a least loaded server of the plurality of servers as indicated by the load information.

3. The method of claim 1, wherein the customer has multiple SenderCompID values associated therewith.

4. The method of claim 1, wherein the transport protocol comprises Transmission Control Protocol (TCP).

5. The method of claim 4, further comprising mapping TCP sequence numbers of FIX packets to spliced sequence numbers associated with the two independent transport protocol connections.

* * * * *